Oct. 21, 1952 W. A. WELDEN ET AL 2,614,720
PRESSURE COOKER WITH PROTECTIVE SHIELD
Filed Nov. 15, 1946
2 SHEETS—SHEET 1
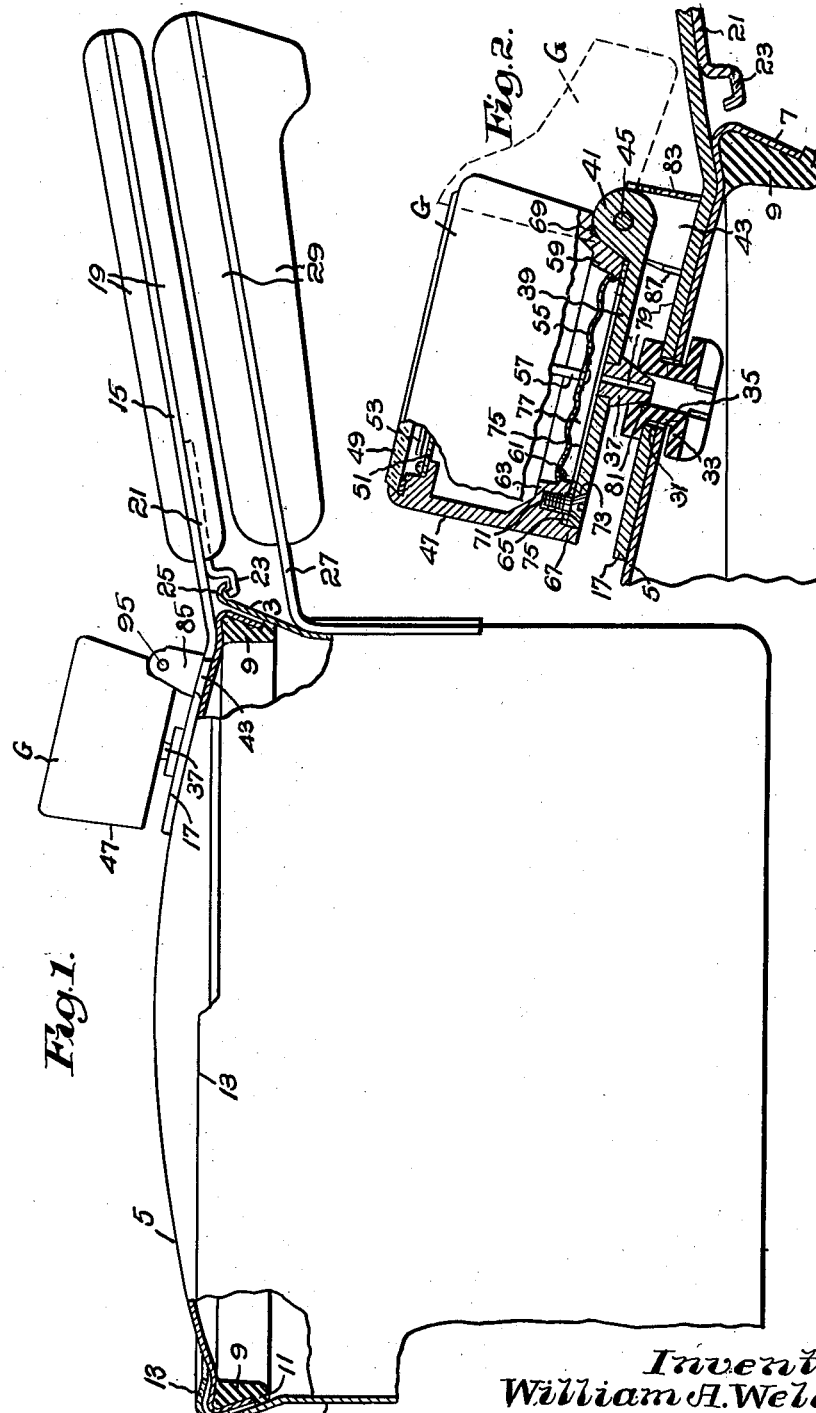

Oct. 21, 1952 W. A. WELDEN ET AL 2,614,720
PRESSURE COOKER WITH PROTECTIVE SHIELD
Filed Nov. 15, 1946 2 SHEETS—SHEET 2
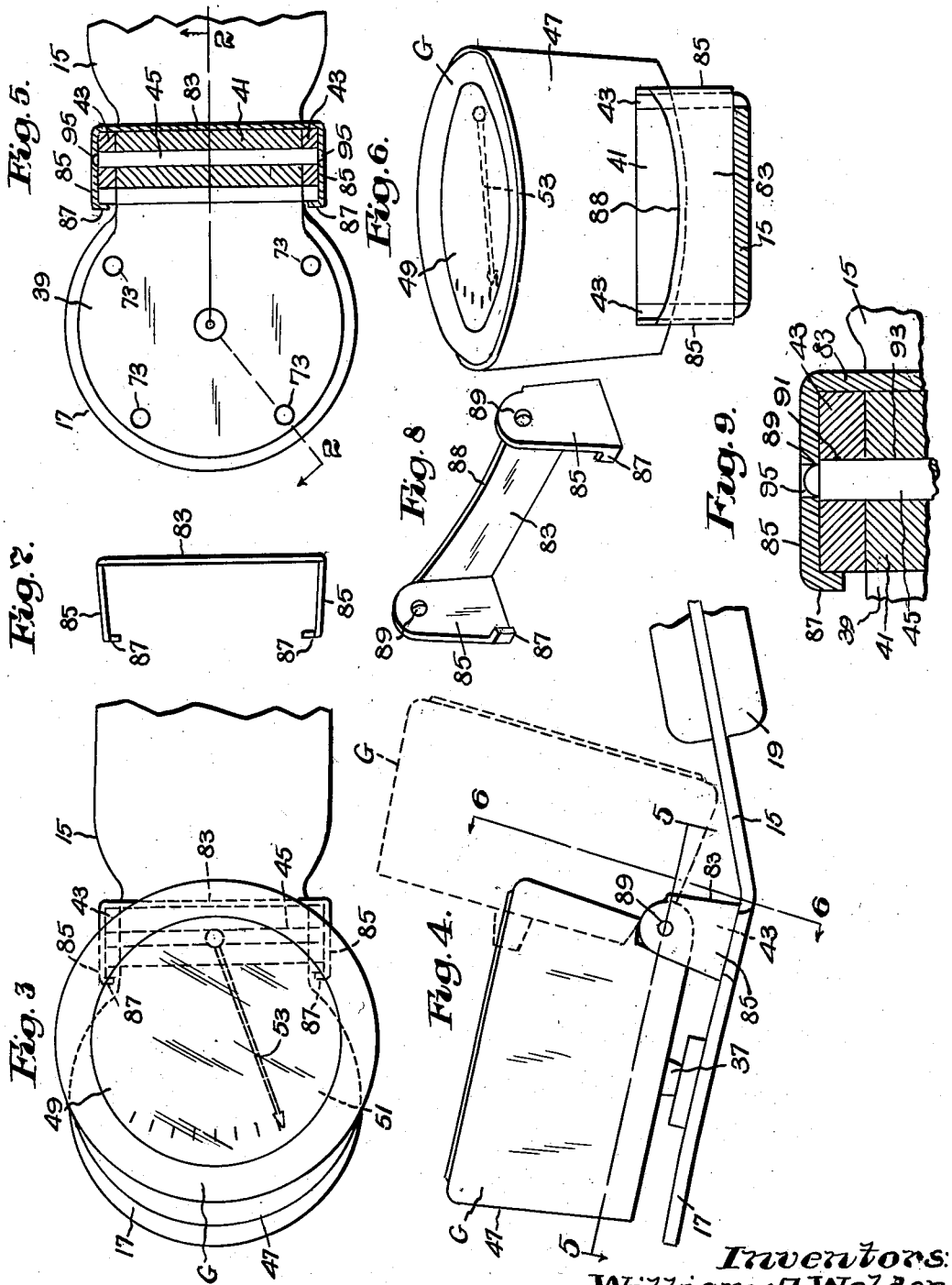
Inventors:
William A. Welden
Glenn C. Wyman.
by Emery Booth Townsend Miller + Weidner.
Attys Patented Oct. 21, 1952

2,614,720

UNITED STATES PATENT OFFICE 2,614,720

PRESSURE COOKER WITH PROTECTIVE SHIELD

William A. Welden, Stamford, Conn., and Glenn C. Wyman, Rome, N. Y., assignors to Revere Copper and Brass Incorporated, Rome, N. Y., a corporation of Maryland Application November 15, 1946, Serial No. 710,044

6 Claims. (Cl. 220—40)

Our invention relates to pressure cookers.

The invention, which has among its objects the provision of improved means for securing a tilting relief valve to a pressure cooker and means for protecting the hand of the operator from steam discharged from the cooker vent opening, will be best understood from the following desciption of a specific embodiment of the invention selected for illustrative purposes; while the scope of the invention will be more particularly pointed out in the appended claims.

In the drawings:

Fig. 1 is an elevation, with parts in section, of a pressure cooker embodying the invention;

Fig. 2 is a vertical section, on an enlarged scale, and with parts in elevation, of the right hand side of the pressure cooker cover and associated parts as viewed in Fig. 1, corresponding to a section on the line 2—2 of Fig. 5;

Figs. 3 and 4 are, respectively, a plan and elevation of the parts shown by Fig. 2 with the cover omitted;

Figs. 5 and 6 are, respectively, sections on the lines 5—5 and 6—6 of Fig. 4;

Fig. 7 is a plan view, and Fig. 8 a perspective, of the combined pivot pin retaining and shield forming clip; and Fig. 9 shows a detail, and corresponds to a fragmentary section on the line 5—5 of Fig. 4 on an enlarged scale.

The pressure cooker illustrated by the drawings is in general identical with that forming the subject matter of applicant Weldon's co-pending application Serial Number 695,128, filed September 6, 1946, and therefore will not be described herein with more particularity than necessary to describe the present invention.

As shown, the pressure cooker comprises a container 1 having an upwardly and outwardly flared brim portion 3. The cover 5 for the cooker is formed with a downwardly and inwardly flaring edge flange 7 supporting a gasket 9 of resiliently yieldable material, which gasket has a portion 11 cooperating with the flared portion 3 of the container for packing the joint between the latter and the cover.

Integral with the upper edge of the flared portion 3 of the container, and extending through substantially one-half the angular extent of said portion, is an inwardly projecting lip 13 positioned above the upper edge portion of the cover when the latter is in place on the container. At one side of the cover is a handle extension 15 having a base portion 17 of circular conformation (see Fig. 5), which portion is spot welded to the upper surface of the cover. This handle extension carries the handle grips 19. To the under side of the handle extension is spot welded a strip 21 of the same width as the extension, the end portion of which strip is downturned and bent to form a hook 23. Diametrically opposite the lip 13 of the container the flared portion 3 thereof is extended outwardly at its upper edge and bent downwardly to form a hook-like lip 25 of approximately the same width angularly of the container as the hook 23. The container is provided with a laterally extending handle extension 27 carrying the handle grips 29.

By the construction above described the left hand edge portion of the cover, as viewed in Fig. 1, may be inserted under the lip 13 of the container, and the gasket 11 carried by the cover seated on the container flared portion 3, when the two handles are sufficiently out of alignment. The handle grips 19 may then be rotated to bring them into alignment with the handle grips 29, which will move the hook 23 under the lip 25 to secure the cover to the container. When pressure builds up in the cooker the cover will rise to seat its upper peripheral edge portion on the lip 13 of the container and cause the hook 23 carried by the cover to seat on the hook-like lip 25 carried by the container, without the gasket 11 moving out of contact with the flared portion 3 of the container.

As illustrated, the cover and base portion 17 of the handle extension 15 are provided with aligned through openings 31 into which is sprung a floating valve seat member 33 of yieldable material such as rubber, this valve seat member having a through opening 35 serving to vent steam through the cover from the interior of the cooker. The vent opening 35 for the cover is controlled by a conical valve 37 carried by a plate-like member 39. The body of this last mentioned member is of circular conformation as shown in Fig. 5, and is opposed to the base portion 17 of the handle extension 15 in spaced relation to said base portion when the valve is closed.

As illustrated, the valve carrying member 39 has at one side thereof a boss 41 positioned between upstanding ears 43 struck up at opposite sides of that portion of the handle extension 15 which lies above the edge portion of the cover. These ears and the boss are provided with aligned perforations through which removably extends a pin 45 serving pivotally to support the valve carrying member on the ears.

Carried at the upper side of the valve carrying member 39 is a pressure gauge G having an annular casing 47, a crystal 49, graduated dial 51, and movable index hand 53 cooperating with the dial. The pressure gauge is operated by a resilient diaphragm 55 (Fig. 2) adapted to be flexed for moving, in opposite directions, the attached pin 57 connected to the index hand 53 by mechanism not illustrated and forming no part of the present invention. The diaphragm, as shown, is carried by the annular internal flange 59 of the pressure gauge casing, being continuously soldered thereto about its periphery, as indicated at 61, so that the interior of the casing above the diaphragm is hermetically sealed. The gauge casing is provided adjacent its lower side with an annular internal flange 63 carrying the diaphragm supporting flange 59. The flange 63 at the under side of the casing is recessed to form an annular shoulder 65 surrounded by a downwardly projecting flange 67. This flange 67 extends continuously about the casing except where the latter is notched out, as indicated at 69, to receive the boss 41 of the valve carrying member 39. The circular body portion of the member 39 is received within the recess formed by the flange 67 and is removably secured to the flange 63 by screws 71 extending through openings 73 in the member 39. Between the shoulder 65 of the flange 63 and the member 39 is a packing gasket 75 having openings through which the screws 71 extend. When the valve 37 is closed pressure fluid is admitted to the chamber 77 between the diaphragm 55 and the member 39 through an opening 79 extending through the valve 37 axially thereof.

The weight of the valve carrying member 39 and gauge carried by it normally holds the valve 37 seated on the valve seat 81 at the upper end of the cover vent opening 35. When the pressure in the cooker increases sufficiently the valve carrying member will swing on the pivot pin 45 to open the valve to permit relief of pressure through the vent opening. The valve however does not rise very far because the steam passing outwardly through the relatively narrow space between the handle extension base 17 and valve carrying member 39 expands and partially condenses to form a reduced pressure zone adjacent the peripheral portions of the space, and thereby prevents the building up of an excessive mean effective pressure in the space tending unduly to force the valve upwardly. The valve carrying member 39 thus serves to protect the operator against an upwardly directed jet of steam from the vent opening 35. However, by diverting the steam in a direction substantially parallel to the upper face of the cover there is danger of steam burning the hand of the operator grasping the handle of the cooker, and the present invention is concerned, among other things, with a shield for preventing such burning, which shield will now be described.

As illustrated (see particularly Fig. 8), the above mentioned shield is constituted by the body portion 83 of a clip having the laterally extending end portions 85, the latter preferably being of substantially the same shape and dimensions as those portions of the ears 43 which project above the handle extension 15. At their lower ends a side edge of each portion 85 of the clip carries an inwardly bent lug 87 opposed to the clip body portion 83. The clip preferably is formed of thin sheet metal so as to be resilient, which enables the clip to be removably forced over the spaced ears 43, the body portion or shield 83 engaging one edge of each ear and the lugs 87 engaging the opposite edges of the ears as indicated in Figs. 2 and 9. When the clip is in place the lateral extensions 85 thereof lie against the outer sides of the ears and the body or shield portion 83 extends from one ear to the other so as to close that portion of the space between the valve carrying member 39 and handle extension 15 which is adjacent the handle grips 19. Preferably, the length of the body or shield portion 83 of the clip equals the distance between the outer surfaces of the ears 43, while the lateral extensions 85 are bent slightly toward each other as indicated in Fig. 7, causing the lateral extensions to flex relative to the body portion when the clip is forced over the ears and thereby secure the clip securely to the ears. As shown, the central portion of the upper edge 88 of the body portion of the clip is depressed to permit the valve and pressure gauge to be swung into their dotted line positions shown by Fig. 4, in which position the valve is held open for permitting escape of air from the cooker when cooking heat is initially applied thereto.

As shown, the lateral extensiaons 85 of the clip above described are formed with perforations 89 of somewhat smaller diameter than the aligned perforations 91 and 93 of the ears 43 and boss 41 of the valve carrying member 39, which aligned perforations receive the removable pivot pin 45. When the clip is forced over the ears its lower edge rests against the base portion 17 of the handle extension 15, and the perforations 89 are so positioned that under such conditions they are in alignment with the perforations 91 of the ears. The pin 45, as shown, is of such length as to extend at opposite ends outwardly beyond the adjacent ears, and these extension portions are rounded as best illustrated at 95 in Fig. 9. Consequently, when the clip is forced over the ears, the rounded edges of the pin snap into perforations 89, and those perforations being of smaller diameter than the pin cause the lateral extensions 85 of the clip to prevent removal of the pin until the clip is removed. The reception of the rounded edges of the pin in the perforations 89 also acts to prevent removal of the clip until the clip is forced off the ears with sufficient force to cause the lateral extensions 85 thereof to flex and permit the ends of the pin to snap out of the perforations 89. Removal of the pin provides for ready detachment from the cover of the pressure gauge and parts attached to it, so that ready access may be had to the screws 71 securing the pressure gauge to the valve carrying member 39. Upon removal of these screws the gauge may be detached from the member 39 for repair or replacement and the chamber 77 of the gauge readily cleaned of foreign matter and condensate.

It will be understood that within the scope of the appended claims wide deviations may be made from the form of the invention described without departing from the spirit of the invention.

We claim:

1. A pressure cooker comprising a container and a cover therefor each rigidly carrying a radially projecting handle extension having a hand grip portion, means for securing the cover to the container operated into engaged position when said cover is rotated relative to said container to position said extensions in vertical alignment, said extensions when so positioned jointly forming a handle for the cooker adjacent the level of the cover, the cover having a vent opening at one side of its vertical axis, which vent opening lies between said axis and such cooker handle when said extensions are so positioned, a weight member operatively supported by the cover above said vent opening for vertical swinging, a pressure relief valve for said vent opening controlled by said weight member for regulating the steam pressure within the cooker when said cover is secured to said container by so positioning said extensions, which weight member presents a downwardly facing surface area in opposed relation to said cover extending radially beyond said vent opening in all directions to act as a shield against upwardly directed steam from said vent opening but causing steam to be discharged from beneath said weight member radially of said vent opening, the cover operatively carrying a pair of upwardly projecting ears positioned at opposite sides, respectively, of the axial line of the cover handle extension, on which ears the weight member is carried for its said vertical swinging, and a shield presenting an upstanding wall extending continuously transversely of the cover handle extension between said vent opening and the hand grip portion of said extension for substantially the entire width of said extension for protecting the pressure cooker handle from radially directed steam, said shield comprising a sheet metal plate operatively fixedly carried at opposite end portions thereof by said ears and extending continuously from one ear to the other.

2. A pressure cooker comprising a container and a cover therefor each rigidly carrying a radially projecting handle extension having a hand grip portion, means for securing the cover to the container operated into engaged position when said cover is rotated relative to said container to position said extensions in vertical alignment, said extensions when so positioned jointly forming a handle for the cooker adjacent the level of the cover, the cover having a vent opening at one side of its vertical axis, which vent opening lies between said axis and such cooker handle when said extensions are so positioned, a weight member operatively supported by the cover above said vent opening for vertical swinging, a pressure relief valve for said vent opening controlled by said weight member for regulating the steam pressure within the cooker when said cover is secured to said container by so positioning said extensions, which weight member presents a downwardly facing surface area in opposed relation to said cover extending radially beyond said vent opening in all directions to act as a shield against upwardly directed steam from said vent opening but causing steam to be discharged from beneath said weight member radially of said vent opening, the cover operatively carrying a pair of upwardly projecting ears positioned at opposite sides, respectively, of the axial line of the cover handle extension, on which ears the weight member is carried for its said vertical swinging, and a shield presenting an upstanding wall extending continuously transversely of the cover handle extension between said vent opening and the hand grip portion of said extension for substantially the entire width of said extension for protecting the pressure cooker handle from radially directed steam, said shield comprising a sheet metal plate carrying at each of opposite ends thereof means for releasably engaging said ears for removably fixedly securing said shield thereto.

3. A pressure cooker having, in combination, a container, a cover for the container adapted to be secured to said container in definite angular relation thereto, means forming a supporting handle for the cooker extending laterally therefrom adjacent the level of said cover, the cover having a vent opening, a weight member above said vent opening, a pressure relief valve for said vent opening controlled by said member, which member presents a downwardly facing surface area in opposed spaced relation to said cover extending radially beyond said vent opening in all directions to act as a shield against upwardly directed steam from said vent opening but causing steam to be discharged from beneath said member radially of said vent opening, a pair of spaced ears projecting upwardly from said cover, on which ears said weight member is pivotally supported for swinging on a horizontal axis positioned between said vent opening and handle when said cover is so secured to said container, and a shield carried by said ears bridging the space between them in the path of steam directed radially of said vent opening from beneath said weight member toward said handle, which shield has resilient end portions adapted to be forced over said ears for securing said shield thereto.

4. A pressure cooker having, in combination, a container, a cover for the container adapted to be secured to said container in definite angular relation thereto, means forming a supporting handle for the cooker extending laterally therefrom adjacent the level of said cover, the cover having a vent opening, a weight member above said vent opening, a pressure relief valve for said vent opening controlled by said member, which member presents a downwardly facing surface area in opposed spaced relation to said cover extending radially beyond said vent opening in all directions to act as a shield against upwardly directed steam from said vent opening but causing steam to be discharged from beneath said member radially of said vent opening, a pair of spaced perforated ears projecting upwardly from said cover, said weight member having a portion positioned between said ears, a pin extending through said portion and the perforations of said ears for connecting said weight member to said ears for swinging on a horizontal axis positioned between said vent opening and handle when said cover is so secured to said container, and a shield carried by said ears bridging the space between them in the path of steam directed radially of said vent opening from beneath said weight member toward said handle, which shield is removably secured to said ears and has opposite end portions overlying the outer sides of said ears for preventing removal of said pin when said shield is secured to said ears.

5. A pressure cooker according to claim 4 in which the shield has resilient end portions adapted to be removably forced over the outer sides of the ears for removably securing said shield thereto, said end portions of said shield being adapted to be engaged by the adjacent ends of the pin for preventing removal of the latter when the shield is so secured to said ears.

6. A pressure cooker according to claim 4 in which the pin is of such length as to extend beyond the outer sides of the ears and has rounded ends, the shield having resilient end portions adapted to be removably forced over the outer sides of said ears, which end portions are provided with recesses for receiving the rounded ends of the pin for preventing removal of said pin when said shield is in place and for securing the shield to said ears.

WILLIAM A. WELDEN.
GLENN C. WYMAN.

REFERENCES CITED

The following references are of record in the file of this patent:

UNITED STATES PATENTS

| Number | Name | Date |
|---|---|---|
| 1,187,721 | Edwards | June 20, 1916 |
| 1,402,517 | Kuno | Jan. 3, 1922 |
| 1,494,487 | Jacobs | May 20, 1924 |
| 1,638,589 | Louw | Aug. 9, 1927 |
| 2,196,759 | Drotning | Apr. 9, 1940 |
| 2,357,634 | Crites | Sept. 5, 1944 |
| 2,436,566 | Goldberg | Feb. 24, 1948 |
| 2,483,297 | Naylor | Sept. 27, 1949 |

FOREIGN PATENTS

| Number | Country | Date |
|---|---|---|
| 229,222 | Great Britain | Feb. 19, 1925 |
| 294,354 | Great Britain | Oct. 11, 1928 |